United States Patent [19]
Schmidt

[11] Patent Number: 5,827,943
[45] Date of Patent: Oct. 27, 1998

[54] METHOD FOR CALIBRATION IN LEVEL MEASUREMENT

[75] Inventor: Hartmut Schmidt, Weil am Rhein, Germany

[73] Assignee: Endress + Hauser GmbH + Co., Maulburg, Germany

[21] Appl. No.: 734,093

[22] Filed: Oct. 21, 1996

[30] Foreign Application Priority Data

Oct. 27, 1995 [EP] European Pat. Off. ............ 95116970

[51] Int. Cl.$^6$ .................................................. G01F 25/00
[52] U.S. Cl. ........................................................ 73/1.73
[58] Field of Search ............................... 73/1.73, 290 R, 73/290 V, 149

[56] References Cited

U.S. PATENT DOCUMENTS

| | | | |
|---|---|---|---|
| 4,853,694 | 8/1989 | Tomecek | 340/621 |
| 5,131,271 | 7/1992 | Haynes et al. | 73/290 V |
| 5,163,323 | 11/1992 | Davidson | 73/290 V |
| 5,277,054 | 1/1994 | Campbell | 73/1.73 |
| 5,438,867 | 8/1995 | van der Pol | 73/290 V |
| 5,452,611 | 9/1995 | Jones et al. | 73/1.73 |

FOREIGN PATENT DOCUMENTS

| | | |
|---|---|---|
| 0 591 816 | 8/1994 | European Pat. Off. . |
| 0 668 488 | 8/1995 | European Pat. Off. . |
| 92/15847 | 9/1992 | WIPO . |

OTHER PUBLICATIONS

Neuartiger Fluessigkeits–Niveauanzeiger (Oct. 1986). Schiff und Hafen, vol. 38, No. 11, p. 89, Hamburg. (English–language summary attached).

Primary Examiner—Hezron E. Williams
Assistant Examiner—Nashmiya Fayyaz
Attorney, Agent, or Firm—Bose McKinney & Evans

[57] ABSTRACT

Measuring the level of a material in a container using a sensor fitted above the highest level occurring and measuring the distance to the surface of the material in the container. An evaluation circuit computes the level from the distance measured by the sensor and the empty distance. The material volume is determined from the relationship between level and material volume memorized in the evaluation circuit. For calibrating a sensor in the case of an unknown empty distance, without having to completely empty the container, the on-going filling or emptying of the container is interrupted and the actual material volume is recorded. Using the sensor to be calibrated a distance measurement is implemented and the actual material volume is entered in the evaluation circuit. The evaluation circuit determines on the basis of the memorized relationship between level and material volume the level corresponding to the entered material volume and computes the empty distance as the sum of the level corresponding to the entered material volume and the distance measured by the sensor. In this way calibration is possible at a single calibration point without having to change the level in the container.

2 Claims, 1 Drawing Sheet

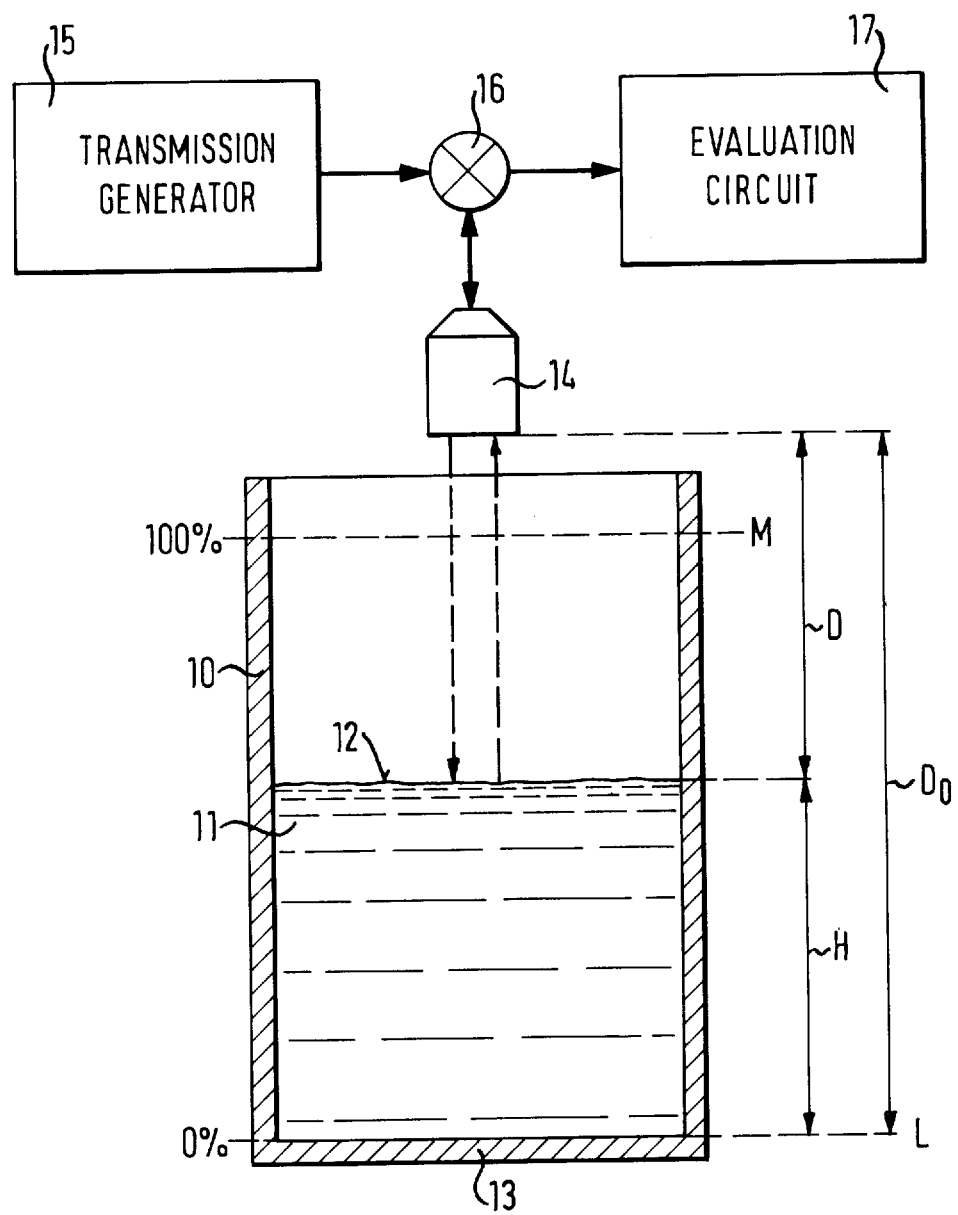

METHOD FOR CALIBRATION IN LEVEL MEASUREMENT

BACKGROUND OF THE INVENTION

The invention relates to a method for calibration in level measurement by means of a sensor located above the highest level occurring which measures the distance to the surface of the material in the container and computes by means of an evaluation circuit the level from the distance measured by the sensor and the empty distance, and which determines and indicates the material volume from the relationship between the level and material volume memorized in the evaluation circuit.

In this context the "empty distance" is the distance which the sensor would have measured were the container empty.

This kind of level measurement is implemented for instance by level meters operating on the basis of the reflection principle, in which the sensor emits ultrasonic waves or electromagnetic waves to the surface of the material and receives the echo waves reflected from the surface of material, the evaluation circuit establishing the distance between the sensor and material surface from the transit time of the waves. Another example for level meters which measure the distance between a sensor arranged above the highest level occurring and the surface of the material are mechanical systems which lower a sounder to the surface of the material.

Correctly sensing and indicating the level in the form of the material volume presupposes in the case of this kind of level measurement that when the sensor is installed the empty distance is precisely determined and memorized in the evaluation circuit and a calibration of the level meter is made.

Hitherto it was usual to undertake calibration at at least two different points, these points being as a rule that at which the container is completely empty and that at which the container is completely full, i.e. to implement calibration the container needed first to be totally emptied and then totally filled. This is highly complicated, time-consuming and a nuisance, because intervening in the on-going production process is involved.

SUMMARY OF THE INVENTION

The object of the invention is to provide a method for calibration in level measurement of the kind as mentioned at the outset which permits calibration at a single calibration point without changing the level in the container.

Achieving this object according to the invention is done by the following method steps:

a) interrupting an on-going filling or emptying of the container;

b) recording the actual material volume;

c) implementing a distance measurement with the sensor to be calibrated;

d) entering the actual material volume in the evaluation circuit;

e) determining the level belonging to the entered material volume on the basis of the memorized relationship between level and material volume and computing the empty distance as the sum from said level and the measured distance in the evaluation circuit.

In the method according to the invention calibration is done at the point which is just attained in the on-going production process, and after calibration the production process can be continued at this point, there being no change of the level in the container inbetween. The time required for implementing the calibration is thus minor, and it also eliminates the expense of bypass containers and additional metering facilities. The method is applicable to containers of any shape for which the relationship between level and material volume is memorized in the evaluation circuit. The method merely needs to exist as an algorithm in the evaluation circuit; further prerequisites are not necessary.

Another embodiment of the method according to the invention serves for calibrating containers for which it is known that a linear relationship between the level and the material volume exists, but the slope of the linear characteristic is unknown. This is the case for containers having a horizontal cross-section which is constant over the full level range, i.e. for instance upright cylindrical or prismatic containers, the base of which is unknown. In the case of these containers, too, calibration at at least two points was necessary hitherto to establish the slope of the characteristic. Here too, the invention makes it possible to carry out the calibration at a single calibration point, without changing the level in the container, by the following method steps:

a) interrupting an on-going filling or emptying of the container;

b) recording the actual material volume and the actual level;

c) implementing a distance measurement with the sensor to be calibrated;

d) entering the actual material volume and the actual level in the evaluation circuit;

e) computing the slope of the linear characteristic from the actual material volume and the actual level and computing the empty distance as the sum of the actual-level and of the measured distance in the evaluation circuit.

BRIEF DESCRIPTION OF THE DRAWING

Further features and advantages will be appreciated from the following description of example embodiments on the basis of the drawing showing schematically metering of the level in a container according to the reflection principle.

DESCRIPTION OF THE PREFERRED EMBODIMENTS

The drawing shows a container 10 containing a material 11. The level H in the container is the height of the surface 12 of the material 11 above the level L corresponding to that of the container empty. In the example shown in the drawing of a container having a flat bottom 13 it is assumed that the level L corresponds to the surface of the bottom 13. The container 10 is full when the height of the surface 13 of the material 11 attains the level M.

The level measurement is done according to the reflection principle with the aid of a sensor 14 which is fitted above the highest level occurring and is configured so that it is able to emit waves to the surface 12 of the material 11 and receive the echo waves reflected from this surface 12. The waves used for the level measurement may be ultrasonic waves, ranging being done according to the pulse transit time principle the same as in echo sounding. In this case the sensor 14 is an ultrasonic transducer which is excited by electrical alternating voltage pulses furnished by a transmission generator 15 via a duplexer to emit ultrasonic pulses and which converts received ultrasonic waves into electrical reception signals which are applied via the duplexer 16 to an evaluation circuit 17. The waves used for the level measurement may also be electromagnetic waves, whereby ranging may be done, the same as in pulsed radar, according to the principle of pulse transit time, too. In this case the sensor 14 is an antenna transmitting the electrical high-frequency pulses furnished by the transmission generator 15 via the duplexer 16 and transferring the received high-frequency signals via the duplexer 16 to the evaluation circuit 17. When employing electromagnetic waves the ranging may also be done the same as with frequency-modulated continuous wave (FMCW) radar; in this case too, the sensor 14 is an antenna which, however, emits a continuous microwave furnished by the transmission generator 15 which is periodically linearly frequency-modulated, for example, according to a ramp function.

In each case the transit time of the waves from the sensor 14 to the surface 12 and back to the sensor 14 is established in the evaluation circuit 17 which in the case of the pulse transit time principle equals the spacing in time between emission of a transmit pulse and reception of the echo pulse reflected from the surface 12, whilst in the case of FMCW radar it results from the frequency difference between the transmitted wave and the received echo wave. From the established transit time and the known propagation rate of the waves used the distance D of the material surface 12 from the sensor 14 is computed. When the surface 12 of the material 11 has the level L, i.e. the container is empty (level H=0), the distance measured with the sensor 14 is the empty distance $D_0$. For every other distance D measured the level H in the container 10 is given by the formula $$H=D_0-D.$$

Generally, the user is not interested in the level H but in the volume V of the material. This volume materializes from the level H when the relationship between the level H and the material volume v is known. In the case of containers having a constant horizontal cross-section over the complete level range, i.e. for example, cylindrical and prismatic (e.g. rectangular) upright containers, the relationship concerned is a simple linear relationship: the material volume V is proportional to the level H. In the case of other containers a non-linear relationship exists between the level H and material volume V, but in most cases the material volume V can be computed from the level H according to a known formula. This applies for example to horizontal cylindrical containers. For totally irregularly shaped containers the relationship between the level H and the material volume v can be established experimentally. For each container the relationship between the level H and the material volume V can thus be stated by a formula, a characteristic or a look-up table.

The relationship between the level H and material volume V is memorized in the form of a formula, a look-up table or a characteristic in the evaluation circuit 17. In the evaluation circuit 17 the material volume V corresponding to the established level H is computed according to the memorized formula or taken from the memorized characteristic or look-up table and indicated. This indication may be made in absolute units of measurement (e.g. liters, hectoliters, cubic meters) or relatively in a percentage between 0% (empty) and 100% (full), whereas the measured distance D and the resulting level H remain as a rule unknown to the user.

On first-time installation of a sensor 14 a calibration must be carried out so that for each distance D measured by the sensor 14 the correct material volume V is indicated. For this purpose it is usual to carry out the calibration at at least two different points. These points are as a rule that at which the container is totally emptied (0%) and that at which it is totally filled. This is highly complicated, time-consuming and a nuisance, because intervening in the on-going production process is involved.

By means of the method described in the following the calibration can be done at a sole calibration point without any changes being necessary to the level condition in the container.

For this purpose the steps in the procedure are as follows:
1. An on-going filling or emptying of the container is interrupted.
2. The actual material volume $V_A$ is recorded.
3. A distance measurement is performed with the sensor to be calibrated, resulting in a distance $D_A$.
4. The actual material volume $V_A$ is entered in the evaluation circuit.
5. The evaluation circuit determines, on the basis of the memorized relationship between level and material volume, the level $H_A$ belonging to the entered actual material volume $V_A$ and computes the empty distance $D_0$ from the level $H_A$ and the measured distance $D_A$:

$$D_0=H_A+D_A,$$

which then forms the basis for the measurement.

This concludes calibration, and the filling or emptying of the container can again be enabled. The evaluation circuit then provides a continual indication of the correct material volume.

By this method the calibration is made at a single point without any change to the material volume being necessary. In particular, there is no longer the necessity to completely empty the container and then to completely fill it.

One variant of the method described permits calibration in the case of a container for which it is known that a linear relationship exists between the level H and the material volume V:

$$V=k \cdot H,$$

but the coefficient k, i.e. the slope of the linear characteristic, is not known. This is the case when containers have a constant horizontal cross-section over the full level range, i.e. for example upright cylindrical or prismatic containers, when the base is unknown. In this case the calibration is done in the following steps:
1. An on-going filling or emptying of the container is interrupted.
2. The actual material volume $V_A$ and the corresponding actual level $H_A$ are recorded.
3. A distance measurement is performed with the sensor to be calibrated, resulting in a distance $D_A$.
4. The actual material volume $V_A$ and the corresponding level $H_A$ are entered in the evaluation circuit, the evaluation circuit then computing from the entered values the slope k of the linear characteristic $$k=V_A/H_A$$

and from the entered level $H_A$ and the measured distance $D_A$ the empty distance $D_0$ $$D_0=H_A+D_A.$$

These values then form the basis for the further measurement.

This concludes calibration, and the filling or emptying of the container can be reinitiated. The evaluation circuit then provides a continual indication of the correct material volume.

By this method, too, the calibration is made at a single point without any change to the material volume being necessary. In particular, there is no longer the necessity to completely empty the container and then to completely fill it again.

It will be appreciated that the invention is not restricted to the application in level measurement according to the reflection principle as described above by way of example; it instead being suitable for all level measurement methods in which the distance between a sensor applied above the highest occurring level and the surface of the material is measured, this also including for example mechanical systems.

I claim:

1. A method for calibrating a device for measuring a level and a volume of a material in a container wherein the device includes a sensor located above the highest fill level of the material which measures a distance to the surface of the material in the container and an evaluation circuit in which a relationship between the level of the material and the volume of the material in the container is stored, said evaluation circuit computing the level of the material in the container using the distance measured by the sensor and an empty distance corresponding to a distance measured by the sensor when the container is empty, and said evaluation circuit determining the volume of the material in the container using the computed level of the material in the container and the stored relationship between the level of the material and the volume of the material, said calibration method comprising the steps of:

a) interrupting an on-going filling or emptying of the container;
   b) recording an actual volume of the material in the container during the interruption;
   c) measuring the distance to the surface of the material in the container with the sensor of the measuring device to be calibrated;
   d) entering the actual volume of the material into the evaluation circuit;
   e) determining, in the evaluation circuit, the level of the material corresponding to the entered actual volume of the material as a function of the stored relationship between the level of the material and the volume of the material;
   f) computing the empty distance by summing the level of the material determined in the evaluation circuit and the distance to the surface of the material measured with the sensor; and
   g) storing the computed empty distance in the evaluation circuit for use in computing the level of the material and in determining the volume of the material in the container.

2. A method for calibrating a device for measuring a level and a volume of a material in a container wherein the device includes a sensor located above the highest fill level of the material which measures a distance to the surface of the material in the container and an evaluation circuit in which a relationship between the level of the material and volume of the material in the container is stored, said evaluation circuit computing the level of the material using the distance measured by the sensor and an empty distance corresponding to a distance measured by the sensor when the container is empty, and said evaluation circuit determining the volume of the material in the container using the computed level of the material and the stored relationship between level of the material and volume of the material; wherein the relationship between the level of the material and volume of the material in the container is a linear relationship of unknown slope; said calibration method comprising the steps of:

a) interrupting an on-going filling or emptying of the container;
   b) recording an actual volume of the material and an actual level of the material in the container during the interruption;
   c) measuring the distance to the surface of the material in the container with the sensor of the measuring device to be calibrated;
   d) entering the actual volume of the material and the actual level of the material into the evaluation circuit;
   e) computing, in the evaluation circuit, the slope of the linear relationship between the level of the material and the volume of the material using the actual volume of the material and the actual level of the material;
   f) computing the empty distance by summing the actual level of the material and the distance to the surface of the material measured with the sensor; and
   g) storing the computed slope of the linear relationship between the level of the material and the volume of the material and the computed empty distance in the evaluation circuit for use in computing the level of the material and in determining the volume of the material in the container.

* * * * *